United States Patent
Takazawa

(10) Patent No.: US 9,444,693 B2
(45) Date of Patent: Sep. 13, 2016

(54) RELAY DEVICE, INFORMATION PROCESSING SYSTEM, RELAY DEVICE CONTROL METHOD, IMAGE FORMING APPARATUS MANAGEMENT METHOD, AND STORAGE MEDIUM

(71) Applicant: CANON KABUSHIKI KAISHA, Tokyo (JP)

(72) Inventor: Satoshi Takazawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 347 days.

(21) Appl. No.: 13/748,644

(22) Filed: Jan. 24, 2013

(65) Prior Publication Data

US 2013/0204996 A1    Aug. 8, 2013

(30) Foreign Application Priority Data

Feb. 2, 2012   (JP) ................ 2012-020933

(51) Int. Cl.
*G06F 15/173* (2006.01)
*H04L 12/24* (2006.01)
*H04L 29/08* (2006.01)

(52) U.S. Cl.
CPC ............ *H04L 41/50* (2013.01); *H04L 41/08* (2013.01); *H04L 67/125* (2013.01)

(58) Field of Classification Search
CPC ...... G06F 3/1204; G06F 3/1285; G06F 8/71; H04L 41/08; H04L 41/50; H04L 67/125
USPC .......................................... 709/223
See application file for complete search history.

(56) References Cited

U.S. PATENT DOCUMENTS

| | | | |
|---|---|---|---|
| 6,498,611 B1 * | 12/2002 | Beard et al. ............ | 715/752 |
| 2006/0020782 A1 * | 1/2006 | Kakii ............ | H04L 9/3263 |
| | | | 713/156 |
| 2011/0279843 A1 * | 11/2011 | Miyata ............ | G06F 3/1205 |
| | | | 358/1.13 |

FOREIGN PATENT DOCUMENTS

| | | | |
|---|---|---|---|
| JP | 2006-239947 A | | 9/2006 |
| JP | 2006239947 A | * | 9/2006 |

* cited by examiner

*Primary Examiner* — Tauqir Hussain
*Assistant Examiner* — Javier O Guzman
(74) *Attorney, Agent, or Firm* — Carter, DeLuca, Farrell & Schmidt, LLP

(57) ABSTRACT

A relay device identifies information acquired from an image forming apparatus (managed device) as private data to be managed in the local system and public data to be managed on a management device on a cloud, and sends the public data together with a pointer to the private data to the management device. The relay device acquires the public data from the management device and when applying the private data to the managed device together with the acquired public data, the relay device acquires the private data based on the pointer and distributes that data together with the public data to the managed device.

8 Claims, 10 Drawing Sheets

| Setting item | Data treatment |
|---|---|
| Device name | Public |
| Product name | Public |
| IPv4 Address | Public |
| Address book | Private |
| Settings certificate | Private |
| ... | ... |

FIG. 7

```
<?xml version="1.0" encoding="utf-8"?>
<OriginalData>
        <item contents="DeviceName">
                <classification>public</classification>
                <value>Device0001</value>
                <Date>2011-12-01 10:00</Date>
        </item>
        <item contents="ProductName">
                <classification>public</classification>
                <value>PrinterABC5000</value>
                <Date>2011-12-01 10:00</Date>
        </item>
        <item contents="IPv4Address">
                <classification>public</classification>
                <value>192.168.10.1</value>
                <date>2011-12-01 10:00</date>
        </item>
        <item contents="AddressBook">
                <classification>private</classification>
                <pointer>
                        <clientId>1059320</clientId>
                        <contentsKey>1111</contentsKey>
                </pointer>
                <date>2011-12-01 10:00</date>
        </item>
        <item contents="..."></item>
</OriginalData>
```

FIG. 8A

| Relay device ID | Global IPv4 (Relay device) | Private IPv4 (Relay device) | Device name | IPv4 (Device to be managed) |
|---|---|---|---|---|
| 1059320 | xxx.xxx.xxx.001 | 192.168.10.253 | Device 001 | 192.168.10.1 |
| | | | PrintABC65 | 192.168.10.45 |
| | | | ... | ... |
| 1064831 | xxx.xxx.xxx.002 | 192.168.55.253 | Device 481 | 192.168.55.4 |
| | | | LargePrinter3 | 192.168.55.7 |
| ... | | | | |

| Relay device ID | Global IPv4 (Relay device) | Private IPv4 (Relay device) | Device name | IPv4 (Device to be managed) |
|---|---|---|---|---|
| 1059320 | xxx.xxx.xxx.001 | 192.168.10.253 | Device 001 | 192.168.10.1 |
| | | | PrintABC65 | 192.168.10.45 |
| | | | ... | ... |
| | | | Device 481 | 192.168.10.211 |
| 1064831 | xxx.xxx.xxx.002 | 192.168.55.253 | LargePrinter3 | 192.168.55.7 |
| ... | | | | |

1001

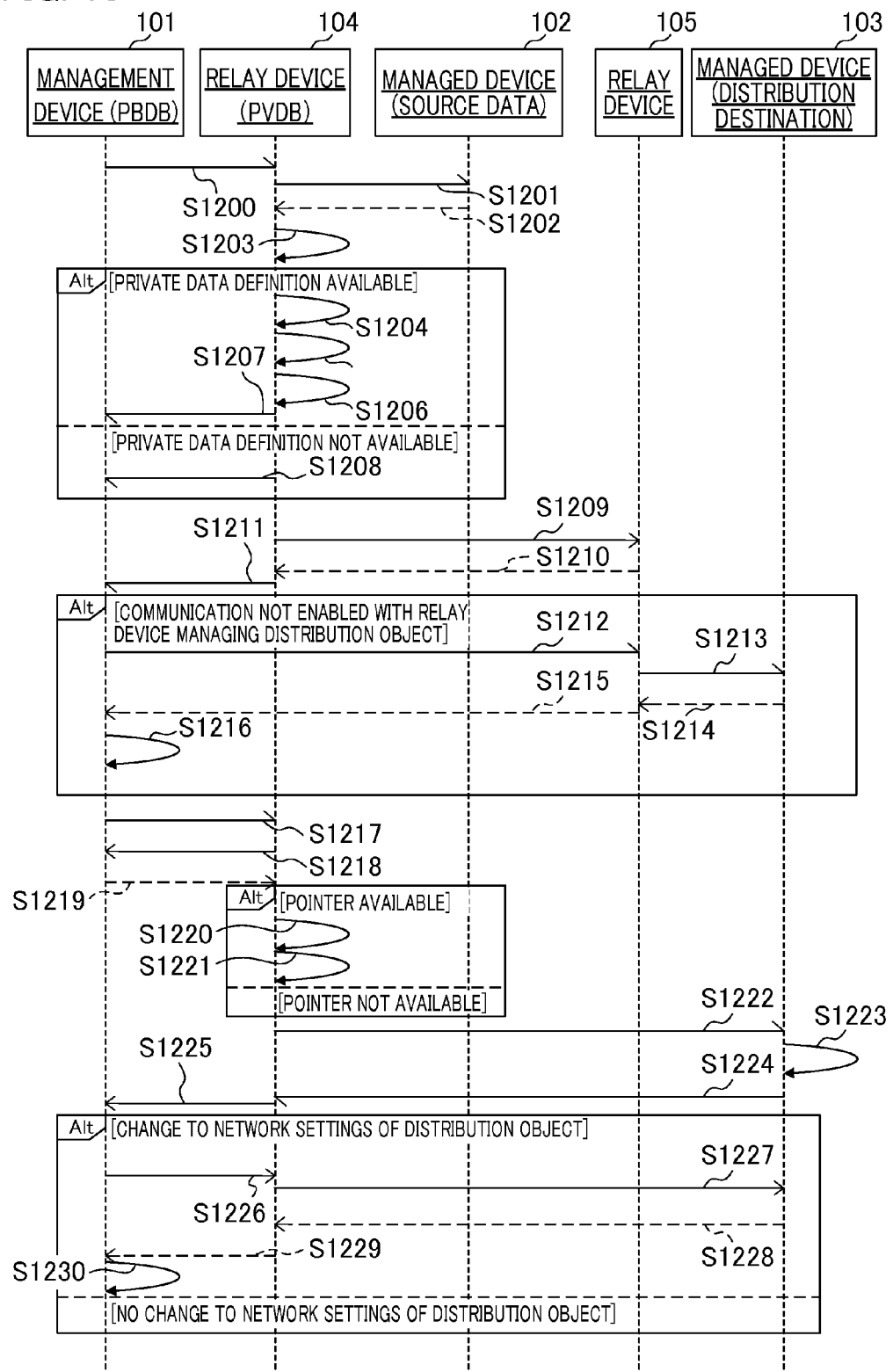

RELAY DEVICE, INFORMATION PROCESSING SYSTEM, RELAY DEVICE CONTROL METHOD, IMAGE FORMING APPARATUS MANAGEMENT METHOD, AND STORAGE MEDIUM

BACKGROUND OF THE INVENTION

1. Field of the Invention

The present invention relates to a relay device, an information processing system, a method of controlling relay device, a method of managing image firming apparatus, and a storage medium.

2. Description of the Related Art

A management method in which a network device management device on an external server (hereinafter referred to as "cloud") that can be used via the Internet manages a network device in an intranet has been proposed. For example, the network device in the intranet is a printer, a multifunctional device or the like that is used in an office or the like. This management method uploads information related to the network device to be managed onto a management device on the cloud. In this manner, the management device can ascertain the operating state of the network device.

It is assumed that an information processing system for distributing information by downloading information that has been uploaded onto the cloud from the printer or multifunctional device (hereinafter referred to as image forming apparatus), onto another image forming apparatus in a local system such as an intranet or the like.

On the other hand, generally, a network device such as an image forming apparatus or the like contains data (scan data or the like) that is saved by a user or setting information (address books, application software or the like) that defines the operation or the like of the network or the device. This setting information or data often requires maintenance of security or prevention of unauthorized access in relation to the information. Furthermore, the importance of the confidentiality of the data or the setting information differs depending on the user.

Japanese Patent Application Laid-Open No. 2006-239947 discloses a control method for deleting at least information requiring security maintenance among information related to the image forming apparatus after backing up from a storage device provided in the image forming apparatus onto a server.

It is assumed that the control method disclosed in Japanese Patent Application Laid-Open No. 2006-239947 is applied to an information processing system for distributing information by downloading information, uploaded from the image forming apparatus onto the cloud, onto another image forming apparatus in the local system. However, for example, the importance of confidentiality in relation to information is different for each user, and important information associated with a high level of confidentiality is subject to a restriction for uploading from the image forming apparatus to the management device on the cloud. Therefore, all information cannot be simply uploaded onto the cloud. Furthermore, when the upload destination for information is a server in the intranet, the management device on the cloud cannot manage information of the image forming apparatus.

SUMMARY OF THE INVENTION

The information processing system according to the present invention executes separate management of information related to the image forming apparatus including first information managed in the local system and second information also capable of management in a management device other than the local system, and the management device is configured to manage both the first information and the second information.

The relay device according to a first embodiment of the present invention is a relay device provided in a local system that performs communication from the local system comprising the image forming apparatus through a network to a remotely provided management device. The relay device includes an identification unit configured to identify information acquired from the image forming apparatus as first information to be managed in the local system and second information to be managed outside of the local system, a transmitting unit configured to transmit to the management device the identified second information and management information linking the first information to be managed in the local system with the second information, and an application unit configured to acquire the second information from the management device and apply the second information to the image forming apparatus in the local system. When the first information together with the acquired second information is applied to the image forming apparatus in the local system, the application unit acquires the first information based on the management information and distributes the acquired first information together with the second information to the image forming apparatus.

Further features of the present invention will become apparent from the following description of exemplary embodiments with reference to the attached drawings.

BRIEF DESCRIPTION OF THE DRAWINGS

FIG. 7 illustrates an example of the configuration of public data.

FIG. 8A and FIG. 8B illustrate an example of relay device related information.

FIG. 10 is a sequence diagram describing an example of an operational process of the device management system.

BRIEF DESCRIPTION OF THE EMBODIMENTS

The embodiment of the present invention will be described below with reference to the figures. The device management system according to each embodiment described below applies (for example, copies) setting information for an image forming apparatus to another image forming apparatus.

First Embodiment

Figure 1A:
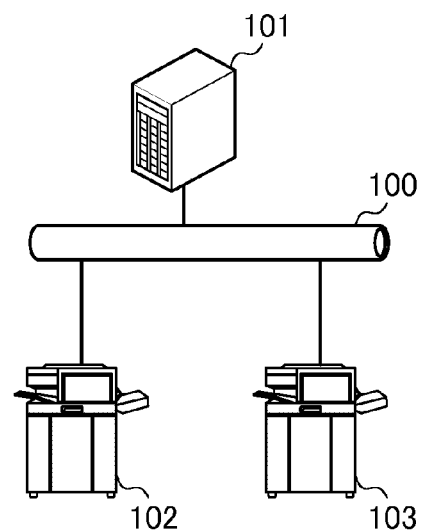
FIG. 1A and FIG. 1B illustrate a configuration example of a device management system according to the present invention.
Figure 1B:
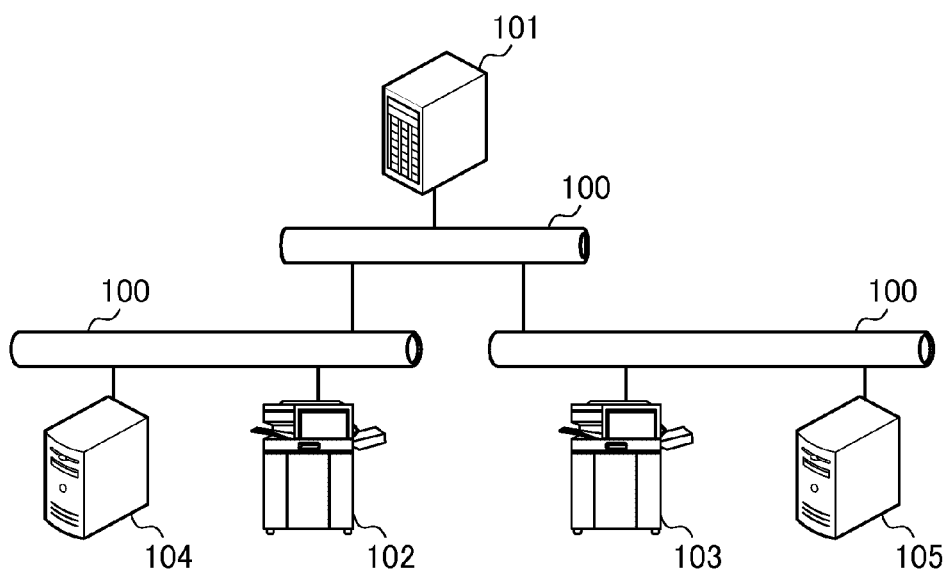

FIG. 1A and FIG. 1B illustrate a configuration example of a device management system according to the present invention. FIG. 1A illustrates a configuration example of a device management system according to a first embodiment. The device management system is an information processing system and is configured from network management devices 101 (hereinafter referred to as a management device) and network devices 102, 103 (hereinafter referred to as a managed device) that are mutually connected by a network 100. The managed device is provided in a local system.

The management device 101 manages the managed devices 102 and 103. The management device 101 is provided on the cloud, that is to say, outside of the local system. Furthermore, the management device 101 has a configuration that includes a general personal computer. The managed devices 102 and 103 are connected with the management device 101 by the network 100. The managed devices 102 and 103 are an image forming apparatus for example such as a multifunction peripheral (MFP), a printer, a FAX or the like. An arbitrary number of the management device 101 and the managed devices 102 and 103 illustrated in FIG. 1A may be connected to network 100.

Figure 2A:
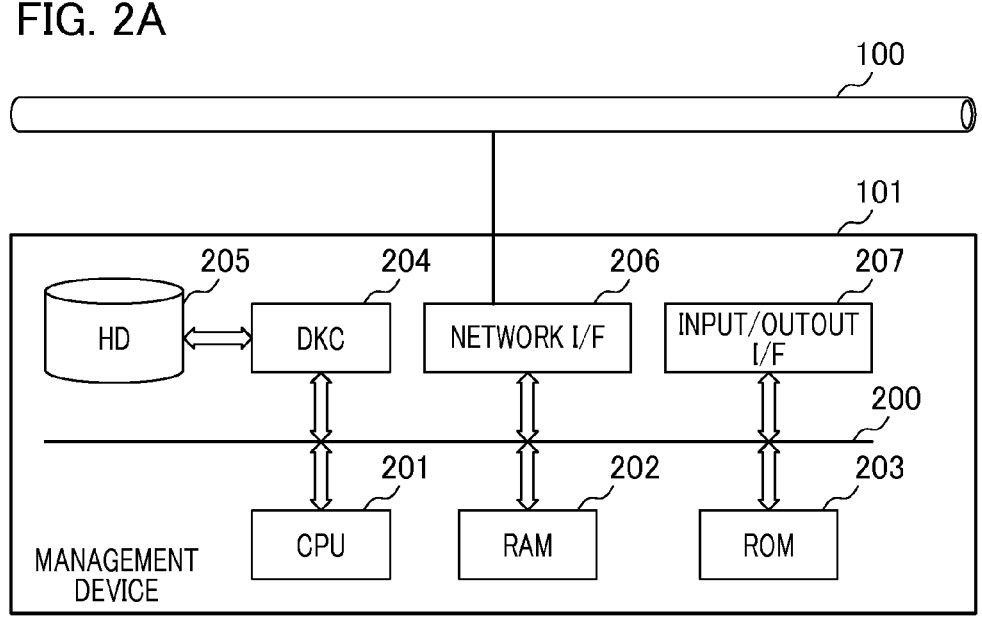
FIG. 2A is a configuration example of hardware for the management device.
Figure 2B:
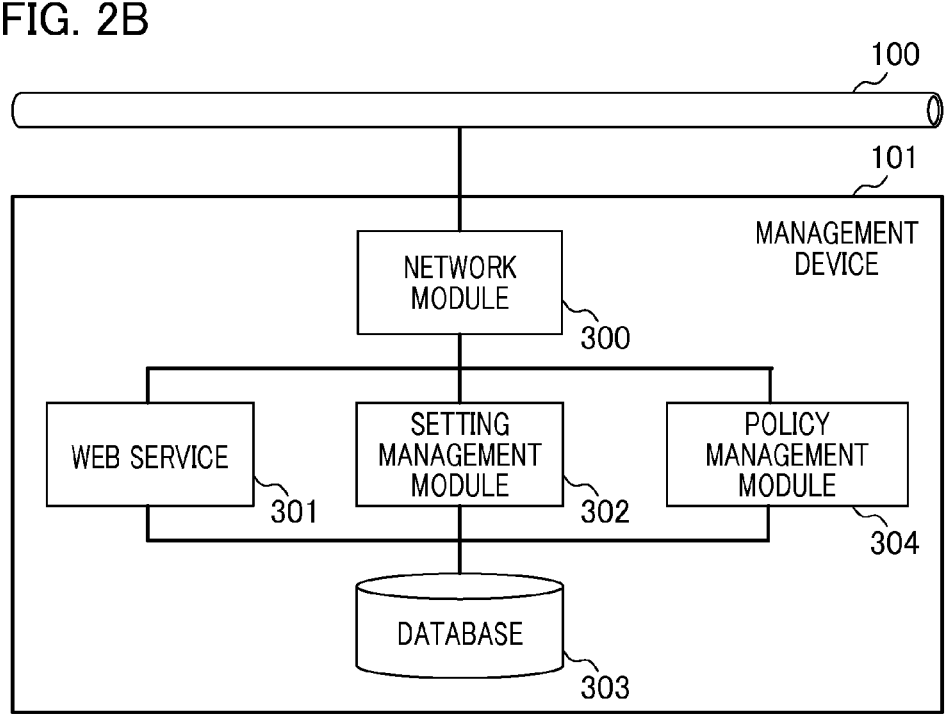
FIG. 2B is an example of a functional block diagram of a management device.

FIG. 2A and FIG. 2B respectively illustrate a hardware configuration example of the management device and an example of a functional block diagram of the management device. FIG. 2A illustrates a hardware configuration example of the management device. A system bus 200 is a common data exchange pathway between respective components that configure the computer. A central processing unit (CPU) 201 is a device that executes calculation processing, overall control of the computer or the like. A random access memory 202 (RAM) indicates a region that stores and executes data or programs during processing operations.

A read only memory (ROM) 203 is a region that stores programs such as the system startup program. A disk controller (DKC) 204 executes control of an external storage device such as a hard disk (HD) 205 or the like. The HD 205 stores programs and data and loads the programs or data onto the RAM 202 or the HD 205 as required. A network I/F 206 is connected to the network 100 for network communication. An input/output interface (I/F) 207 is connected to a keyboard, mouse, display or the like and controls input and output of data.

The management device 101 is operated in a configuration in which the CPU 201 executes basic input/output (I/O) programs and OS. The basic I/O program is stored in the ROM 203 and the OS is stored in the HD 205. When the power source of the computer portion is turned ON, an initial program of the basic I/O program is loaded and the OS is loaded from the HD 205 to the RAM 202 and then operation of the OS is commenced.

FIG. 2B is an example of a functional block diagram of the management device. The management device 101 includes a network module 300, a Web service 301, a setting management module 302, a database 303, and a policy management module 304. The respective modules illustrated in FIG. 2B are stored in the HD 205 as programs, and are executed by the CPU 201.

The network module 300 communicates with the managed devices 102 and 103 by connection through the network 100. The Web service 301 receives a GET request in HTTP from the Web browser of an external device (not illustrated), and provides services by replying to Web page data stored in the HD 205.

The Web service 301 interprets a request from a user input into the Web page data and distributes work to the setting management module 302 or the like as described below. In the present example, although the management device 101 communicates by use of HTTP, there is no limitation to HTTP in this regard and a communication protocol such as HTTPS, FTP or the like may be used. Furthermore, the service that replies to the Web page data described above is not limited to a response to a request from an external device (not illustrated).

The setting management module 302 manages data such as setting information in the managed devices 102 and 103. For example, the setting management module 302 outputs a data acquisition request to the managed device in order to acquire data that is set and stored in the managed device. Furthermore, the setting management module 302 stores or reads out the acquired data into the database 303.

The setting management module 302 realizes Web applications together with the Web service 301 for managing the managed devices 102 and 103. The method of realizing the management device is not limited to a Web application and may include a native application.

The database 303 stores data or the like acquired from the managed devices 102 and 103 by the setting management module 302. The database 303 may be provided on a device that is separate from the management device 101 as long as access to the Web service 301 or the setting management module 302 is enabled.

A policy management module 304 manages policy that is determined by a user in relation to how to handle data. An example of the policy is illustrated in FIG. 4 described below. The policy management module 304 stores information, input by the user from the input/output I/F 207, in the database 303 or the HD 205, and acquires a policy stored in the HD 205. The stored policy may be sent to the managed devices 102 and 103 via a network module 500. The management device 101 may synchronize this policy with the stored policy prepared by the managed devices 102 and 103 as described below.

Figure 3A:
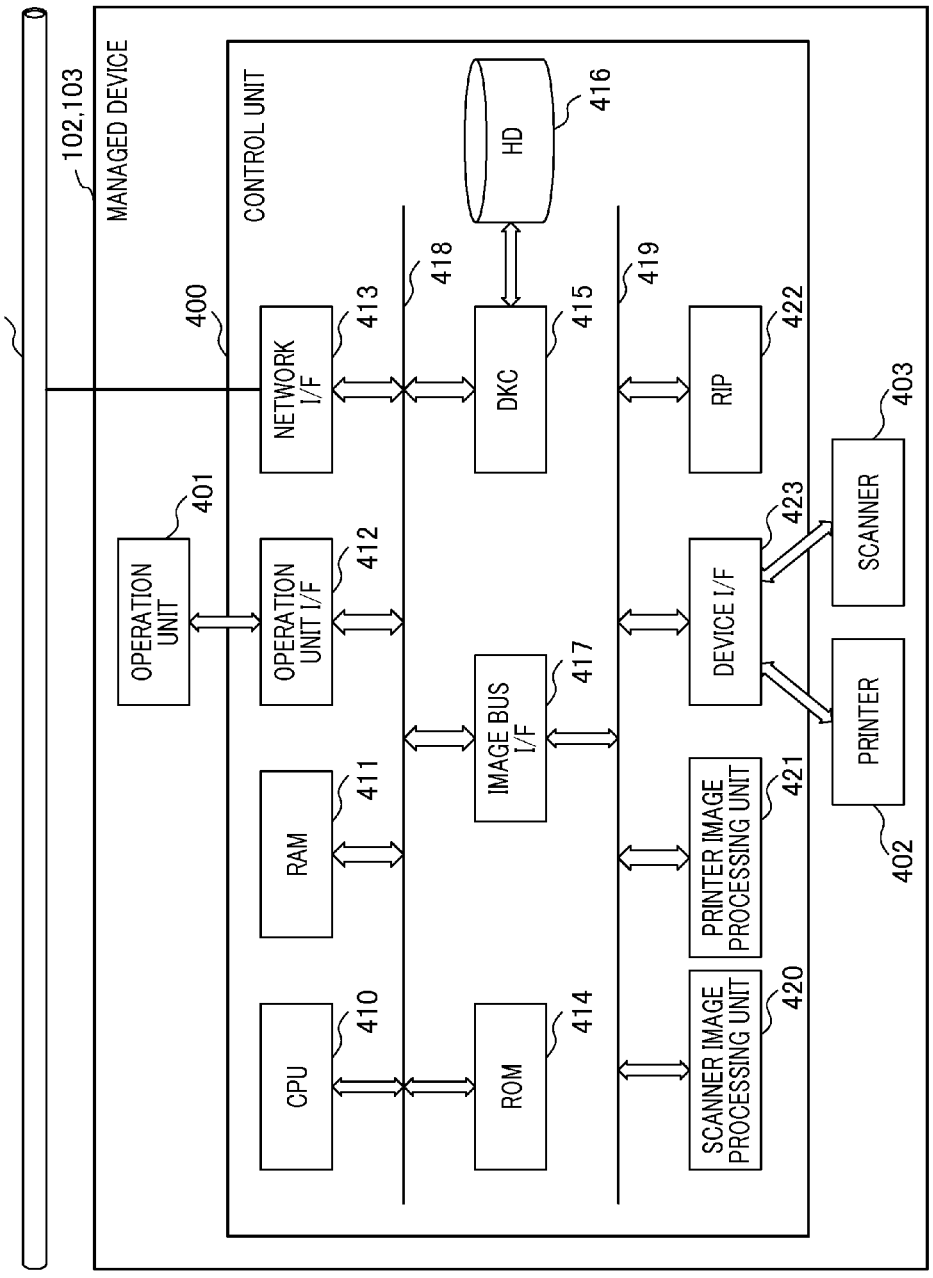
FIG. 3A is a configuration example of hardware for a managed device.
Figures 3B, 4:
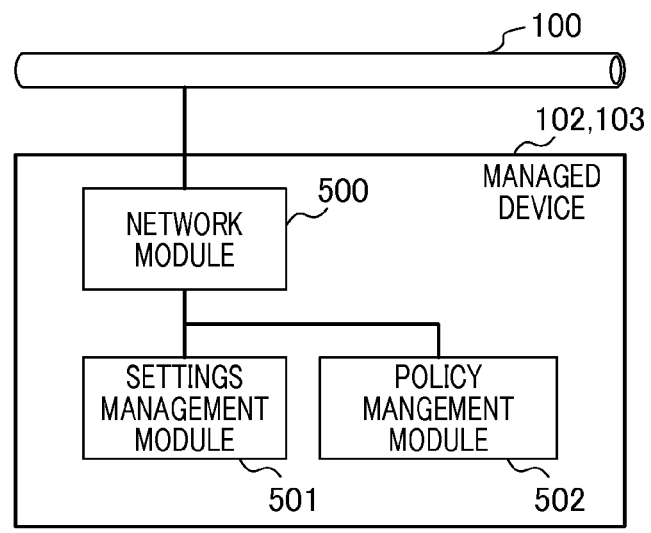
FIG. 3B is an example of a functional block diagram of the managed device.
FIG. 4 illustrates an example of a policy managed by the policy management module.

FIG. 3A and FIG. 3B illustrate a configuration example of hardware for the managed device and a functional block diagram of the managed device. FIG. 3A is a hardware configuration example of the managed device. The managed devices 102 and 103 include a control unit 400, an operation unit 401, a printer 402, and a scanner 403. The control unit 400 includes a processing unit for related operations that has a CPU 410, a RAM 411, an operational unit I/F 412, a Network I/F 413, a ROM 414, a DKC 415, an HD 416, an image bus I/F 417, and a system bus 418.

The control unit 400 includes a processing unit for scan operations that has an image bus 419, a scanner image processing unit 420, a printer image processing unit 421, an RIP 422, and a device I/F 423. The scanner 403 and the scanner image processing unit 420 are provided in the control unit 400 as required.

The CPU 410 is a controller configured to perform overall control of the control unit 400. The RAM 411 is an image memory for temporary storage of image data. The operational unit I/F 412 is an interface with the operational unit 401, and outputs image data to the operational unit 401 for display by the operational unit 401. Furthermore, the operational unit I/F 412 includes the function of communicating information, that is input by the user through the operational unit 401, to the CPU 410.

The Network I/F 413 is an interface that exchanges information with an external device through the network 100. The Network I/F 413 includes a management information base (MIB) that is configured to store various types of information of the managed devices 102 and 103. The various types of information in the MIB indicate information such as the name or state of the managed devices, or the IP address. The ROM 414 is a boot ROM and stores boot programs for the system. A disk controller (DKC) 415 controls a hard disk (HD) 416.

The HD 416 is an external storage device and stores system software or image data. The image bus I/F 417 is a bus bridge that connects the system bus 418 and the image bus 419 to perform data exchange. The system bus 418 is a common data exchange pathway between each component that configures the control unit 400.

The image bus 419 is configured by a PCI bus or an IEEE 1394 and is a high-speed transfer pathway for image data. The scanner image processing unit 420 performs correction, processing and editing of input images. The printer image processing unit 421 performs correction, resolution conversion or the like on print output image data in response to the performance of the printer.

The raster image processor (RIP) 422 develops a PDL command sent from the network 100 into a bitmap image. The device I/F 423 connects the printer 402 that is the image input/output device, and the scanner 403 and control unit 400 to thereby perform synchronous or asynchronous conversion of image data.

FIG. 3B is an example of a functional block diagram of the managed device. The managed devices 102 and 103 include a network module 500, a setting management module 501, and a policy management module 502. The network module 500 functions as an interface with the external device (management device 101 or the like) that is connected to the network 100. The network module 500 for example receives a data acquisition request from the management device 101 and sends the data acquisition request to the setting management module 501. The communication method with the network module 500 and an external device such as the management device 101 includes communication using MIB or communication using SOAP messaging. The network module 500 receives various types of data from the setting management module 501 and responds to the management device 101 through the network 100.

The setting management module 501 performs operations and management in relation to data and setting information retained by the managed devices 102 and 103. The setting management module 501 acquires and retains data from the database or the like (not illustrated) or the HD 416. The setting management module 501 reflects the settings in relation to the managed devices 102 and 103 when the data is setting information. The setting management module 501 divides the acquired data according to a policy managed by the policy management module 502, and combines the divided data.

The policy management module 502 manages policy determined as to how a user handles data r. An example of the policy is illustrated in FIG. 4 described below. The policy management module 502 performs operations such as storing information input by the user from the operational unit 401 in the HD 416 or acquiring a policy stored in the HD 416. The policy management module 502 receives a policy acquisition request from the setting management module 501 and transfers the policy corresponding to the received policy acquisition request to the policy setting management module 501. In this example, although the operational unit 401 inputs the policy, the policy may be acquired for storage from an external unit through the network 100, or may be stored by use of an external tool such as a USB (universal serial bus) or the like.

FIG. 4 illustrates an example of a policy managed by the policy management module. The policy includes data items such as a setting item 600 and data treatment 601. The setting item 600 is the respective item name of the setting information held by the managed device 102 and 103. The data treatment 601 indicates whether the information set in the setting item is information that is not desirable for upload onto the cloud, or whether it is information that may be uploaded onto the cloud.

Private indicates information that is not desirable for upload onto the cloud (first information), that is to say, private information to be managed on the local system. The term "private data" also denotes the feature of information that is not desirable for upload. Private data is handled in accordance with the policy operated on the local system.

Public indicates information that may be uploaded onto the cloud (second information), that is to say, information that can also be managed outside of the local system. The term "public data" also denotes the feature of information may be uploaded onto the cloud.

In the example of a policy in FIG. 4, the device name or the product name is public data, whereas the address book or the like is private data. In relation to the handling of data, although FIG. 4 includes the denotation of both Public and Private, a definition may be provided only in relation to one of those terms if there is a distinction on the cloud in relation to whether management is possible or not. Furthermore, although FIG. 4 includes a denotation in the form of a character string in relation to the treatment of data, the denotation may be configured as integers such as 0 or 1, as logical elements such as True or False, or in another configuration. Furthermore, there is no limitation to setting items 600 and data treatment 601 in the policy and other items may be added.

Figure 5:
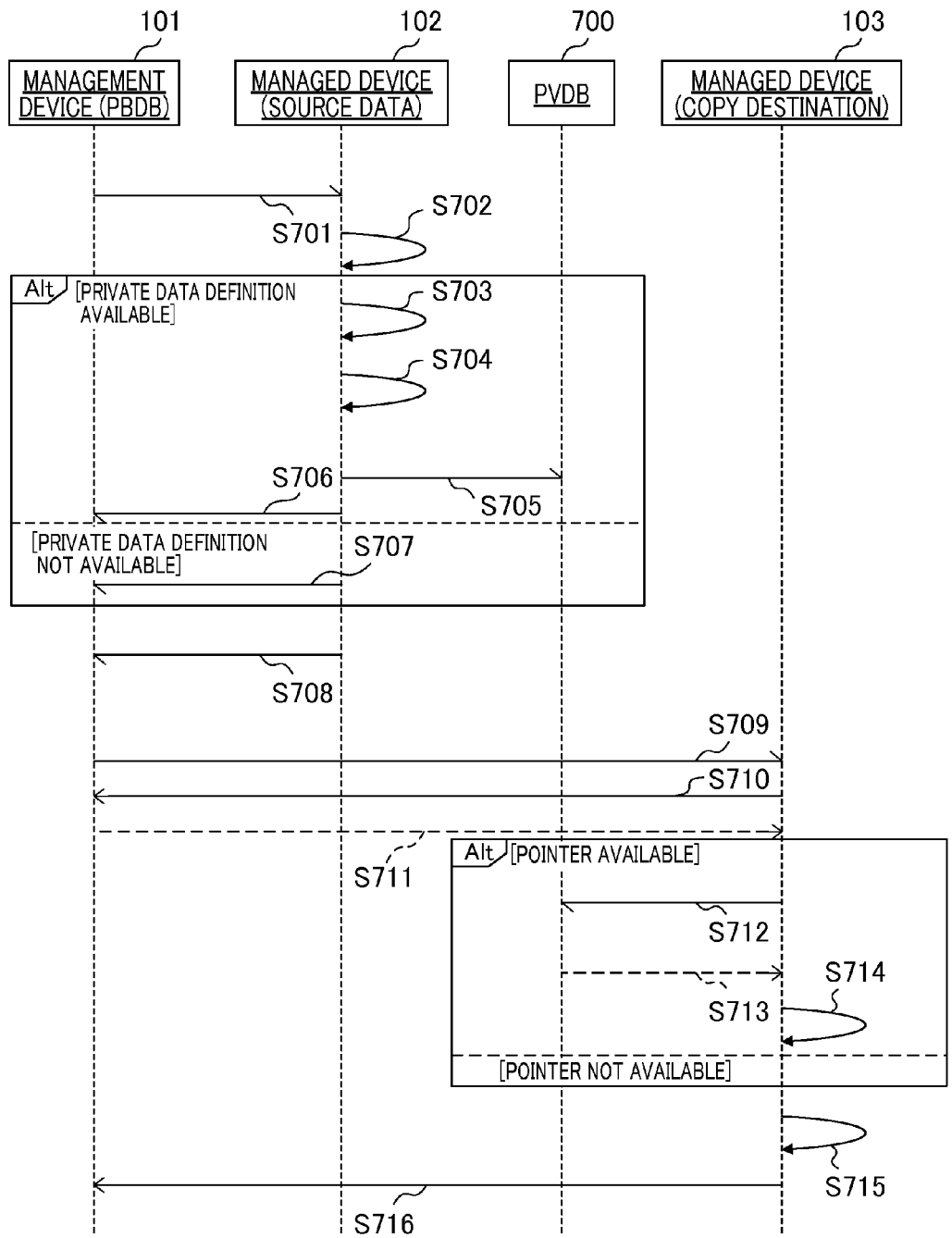
FIG. 5 is a sequence diagram describing an example of an operational process of the device management system.

FIG. 5 is a sequence diagram describing an example of an operational process of the device management system according to the first embodiment. In FIG. 5, an example of processing for copying the setting information of the managed device 102 onto the managed device 103 will be described. In this example, the management device 101 includes a DB(PBDB) function for storing public data. A PVDB 700 is a DB configured to store public data and is provided in the intranet (not illustrated in FIG. 1A). The HD 416 of the managed device 102 or the like may be used as the PVDB 700. That is to say, the management device (PBDB) 101 is a device on the cloud, and the managed devices 102 and 103, and the PVDB 700 are devices on the intranet.

S701 to S708 denotes the processing for acquiring copy original data, and S709 and S716 is the distribution process for sending the setting information to the copying address. Firstly, the management device 101 requests upload of setting information as original data to the managed device 102 (step S701). This request is prepared based on data input on the input screen (setting UI) illustrated in FIG. 6 described below, and is transmitted to the managed device 102 by use of a communication protocol such as SOAP or the like. In the event that sending of a direct request from the management device 101 to the managed device 102 is not possible due to the provision of a firewall or the like, the managed device 102 may acquire a request(s) from the management device 101 in accordance with a periodical polling.

Next, the setting management module 501 of the managed device 102 that receives the request reads the policy illustrated in FIG. 4 from the HD 416, and determines whether or not a definition for the private data is available (step S702). When "Private" is set in the treatment 601 of the data in the policy, a definition for the private data is available. When it is determined that a definition for the private data is available, the processing proceeds to step S703. When it is determined that a definition for the private data is not available, the processing proceeds to step S707.

Next, the setting management module 501 of the managed device 102 divides the setting information into public data and private data according to the determination result in step S702 (step S703). The setting management module 501 of the managed device 102 adds identification information (hereinafter referred to as pointer) in relation to the storage location of private data to the private data divided in the step S703 (step S704). Data prepared in this processing will be described making reference to FIG. 7.

Next, the setting management module 501 of the managed device 102 stores (uploads) the private data (denoted as PV data in FIG. 7) to the PVDB 700 (step S705). Then the setting management module 501 of the managed device 102 stores the public data (denoted as PB data in FIG. 7) to the PBDB (management device 101) (step S706). When communication occurs in the steps S705 and S706, there is no limitation in relation to the communication method.

Next, processing will be described in relation to the configuration in which it is determined in the determination in step S702 that no definition for private data is available in the policy. When a definition is not available for private data, the setting management module 501 of the managed device 102 determines that all data is public data and stores the data (setting information) in the PBDB (step S707). In the present embodiment, although the configuration has been described in which a pointer is added to the public data only when there is private data, identification information indicating that there is no private data may be added to public data when there is no private data. After the processing in step S706 or step S707, the setting management module 501 of the managed device 102 completes communication for uploading with the management device 101 (step S708).

Then, the management device 101 sends the data acquisition request to the managed device 103 at the copy destination (step S709). The data acquisition request is control information that indicates data acquisition (download). The data acquisition request includes the address of the public data stored in step S706 or step S707. The managed device 103 can acquire data from the address stated in the data acquisition request. When a direct request cannot be sent from the management device 101 to the managed device 103, the managed device 103 may acquire a request (s) from the management device 101 in accordance with a periodical polling.

Next, the setting management module 501 of the managed device 103 receives and interprets the data acquisition request. The setting management module 501 of the managed device 103 acquires the public data from the PBDB in accordance with the data acquisition request (step S710, S711). Then, the setting management module 501 of the managed device 103 analyzes the public data. As a result of the analysis of the public data, when a pointer to the private data is included in the public data, the processing proceeds to step S712. On the other hand, when a pointer is not included, the processing proceeds to step S715.

The setting management module 501 of the managed device 103 acquires the private data from the PVDB 700 (step S713). Next, the setting management module 501 of the managed device 103 combines the private data acquired in step S711 with the public data acquired in step S713 (step S714). During the combination operation in step S714, the pointer added to the private data may be discarded since the acquisition of private data is completed.

In step S715, the setting management module 501 of the managed device 103 reflects the various acquired types of data in the managed device 103 itself. More specifically, the data acquired by the setting management module 501 is stored in the HD 416 that manages the setting information. When the above processing is completed, the setting management module 501 of the managed device 103 completes communication with the management device 101 through the network module 500 (step S716).

Although FIG. 5 illustrates commencement of processing by output of a request from the management device 101, processing may be commenced by the managed device 102. In FIG. 5, although storage of PV data is conducted after complete of the pointer addition processing in step S704, step S704 may be executed after the processing in step S705. In FIG. 5, although the acquisition processing (step S711) for PB data continues in response to the request in step S709, public data may be added together with the request in step S709. Furthermore, in FIG. 5, although the data acquired in step S711 and S713 are combined in step S714, the settings in step S715 may be applied without modification or combination.

Figure 6:
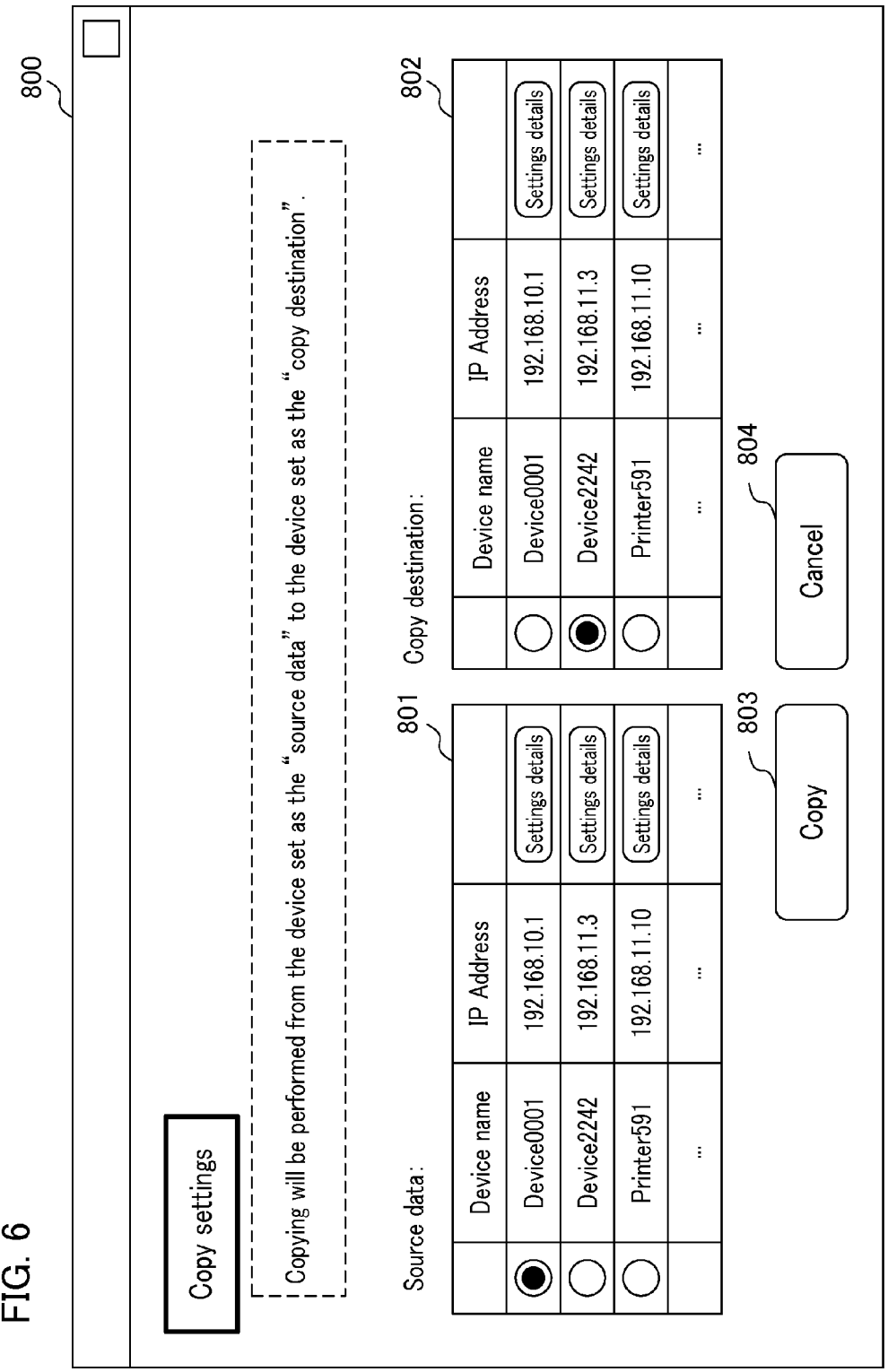
FIG. 6 illustrates an example of a setting UI.

FIG. 6 illustrates an example of a setting UI displayed on the management device for execution of the processing for copying of the setting information of the managed device who is the copy source onto the managed device who is the copy destination. A window 800 is the UI that is displayed for preparation of the request in the steps S701 and S709 in FIG. 5. The window 800 includes a list 801 for selection of the device configuring the copy source, a list 802 for selection of the device who is the copy destination, a button 803 for clicking copy execution, and a button 804 for cancelling the processing. The list 801 is a list for selecting the device who is the copy source, and is selected by the user operation of the window 800. The list 801 displays all the managed devices 102 and 103 managed by the management device 101.

The list 802 is a list for selecting the object of application of the setting information acquired and selected in the list 801. The managed devices 102 and 103 that are managed by the management device 101 are displayed in the list 802 in the same manner as the list 801, and are selected as a device configuring the copy destination by the user. The managed device selected on the list 802 is the device that executes the processing in step S709 to step S711 (managed device 103).

The copy execution button 803 is a button configured to be pressed after completion of selection of the device as a copying destination or copy source on the list 801 and the list 802. When this button is pressed, the management device 101 performs a data upload request (S701 in FIG. 5). The cancel button 804 is a button to cancel the processing. The timing of the cancellation may be before completion of the setting of the window 800 or may be after completion of settings and pressing the copy execution button 803.

FIG. 7 illustrates an example of the configuration of public data processed in step S703 and S704 in FIG. 5. Public data 900 is a portion of the data stated in the policy illustrated in FIG. 4, and is expressed in XML format. The public data is not limited to XML and may be defined in relation to SOAP format or JSOM (JavaScript Object Notation) without limitation on the format.

901 is the structure in which the public data is defined. "Device Name" and "Product Name" (that corresponds to the data items in FIG. 4) are stated as contents items. Furthermore, "Public" is stated in the item illustrated in the tag "classification" as an item corresponding to the data treatment 601 in FIG. 4.

A value for each item of acquired data is stored before data division (step S703 in FIG. 5) in the tag "value". The time of data acquired is stored in the tag "date". 902 is pointer information to the private data added in the step S704 in FIG. 5. In substitution for the tag "value" in 901, a tag "pointer" of a point to the PVDB 700 is added to the pointer information. The tag "pointer" is configured by a "client ID" and a "contents key".

The "client ID" is an identifier configured to uniquely identify information in the PVDB that stores the private data. The "contents key" is an identifier configured to uniquely identify data in the PVDB. In the present example, although "client ID" is used as a PVDB identifier, use is possible of a denotation that uses an arbitrary identifier such as an URI or the like as long as the PVDB is uniquely identified. The private data illustrated in FIG. 7 is sent by the managed device 102 to the management device 101, and the managed device 103 acquires the private data from the management device 101.

In the present embodiment, although a copy of setting information from a single managed device to a single managed device has been described, a plurality of units of managed devices may be provided in relation to the copy source of setting information or the copying destination. In relation to the information for the image forming apparatus, the device management system according to the present embodiment (information processing system) is configured to enable separate management of private data managed in the local system and public data managed outside of the local system. Furthermore, the public data retained by the management device 101 in this device management system is linked by a pointer with the private data. Therefore, the management device 101 according to this device management system enables management of both private data and public data. That is to say, the device management system enables management on the cloud with respect to copying of the setting information, and takes into account a policy corresponding to an importance of confidentiality of each user.

Second Embodiment

In the first embodiment, a download instruction for setting information or an upload instruction for setting information for the copy source are performed by the management device in relation to a directly connected managed device. However, when there are a large number of managed devices, a configuration in which upload or download instructions are output in a one-to-one relationship causes an increase in the load on the management device and reduces efficiency. In the second embodiment described below, a relay device is disposed in the intranet and the relay device outputs upload/download instructions to the managed device in substitution for the management device.

The hardware configuration and the software configuration of the management device 101 and the managed device 102 and 103 are the same as the first embodiment, and therefore such description will not be repeated. Furthermore, the configuration of the policy, the setting UI and the public data in the second embodiment is the same as the first embodiment and therefore such description will not be repeated.

FIG. 1B illustrates a configuration example of the device management system according to the second embodiment. The device management system includes the network 100, the management device 101, the managed devices 102 and 103, and the relay devices 104 and 105. The network 100, the management device 101, the managed devices 102 and 103 are the same as the network 100, the management device 101, the managed devices 102 and 103 illustrated in FIG. 1A. That is to say, the device management system according to the second embodiment includes a plurality of relay devices. The management method in the present embodiment for example is realized by the device management system illustrated in FIG. 1B.

The relay devices 104 and 105 are relay devices according to the present embodiment and are contained in the local system. The relay device 104 is a first relay device and the relay device 105 is a second relay device. The relay devices 104 and 105 relay the instructions from the management device 101 through the network 100, and execute processing relative to the managed devices 102 and 103 that receive the instructions from the management device 101. The relay devices 104 and 105 are enabled to monitor the state of their subordinate managed devices and to send various types of information to the management device 101. That is to say, the relay devices 104 and 105 are relay devices in the local system that perform communication with the management device 101 disposed remotely through a network from the local system that includes the image forming apparatus (managed device). The relationship between the relay devices 104 and 105 and the managed devices 102 and 103 will be described below making reference to FIG. 8A. The relay devices 104 and 105 have a configuration that includes a general personal computer in the same manner as the management device 101. The hardware configuration and the software configuration of the relay devices 104 and 105 are the same as the management device 101. The control method according to the present embodiment is a method configured to control the relay device. Furthermore, the computer program according to the present embodiment executes the control method of the present embodiment on a computer.

FIG. 8A and FIG. 8B illustrate an example of the relay device related information. The relay device related information is information illustrating the relationship between the relay devices 104 and 105 and the managed devices 102 and 103. The management device 101 retains relay device related information in the database 303 or the HD 205. A list 1000 includes information related to the relay devices and information for the managed device that is managed by the relay device. The information related to the relay device in the list 1000 includes an ID that uniquely identifies the relay device, a global IP that communicates between the management device 101 and the relay devices 104 and 105, and a private IP that is used by the relay devices 104 and 105 on the local network.

Although the list 1000 is configured from the above items, there is no limitation in relation to the items as long as unique identification of the relevant relay device or managed device is enabled and it is clear which relay device manages certain managed device as a management object. The list 1000 may be retained by not only the management device 101 but by the relay devices 104 and 105. In the list 1000, although the relay device has a global IP and a private IP, a DHCP server or a router (not illustrated) or the like may be allocated, and the list may contain only the private IP. Furthermore, the private IP may be omitted and the list may only contain the relay device ID and the global IP. On the other hand, the list 1000 includes the device name of each managed device and the IP of the managed device as information for the managed device.

When reference is made to the relay device related information in FIG. 8A, the relay device 104 (relay device ID "1059320") can be seen to manage the "Device 001" or the like. Furthermore, the relay device 105 (relay device ID "1064831") can be seen to manage the "Device 481" or the like.

Figure 9:
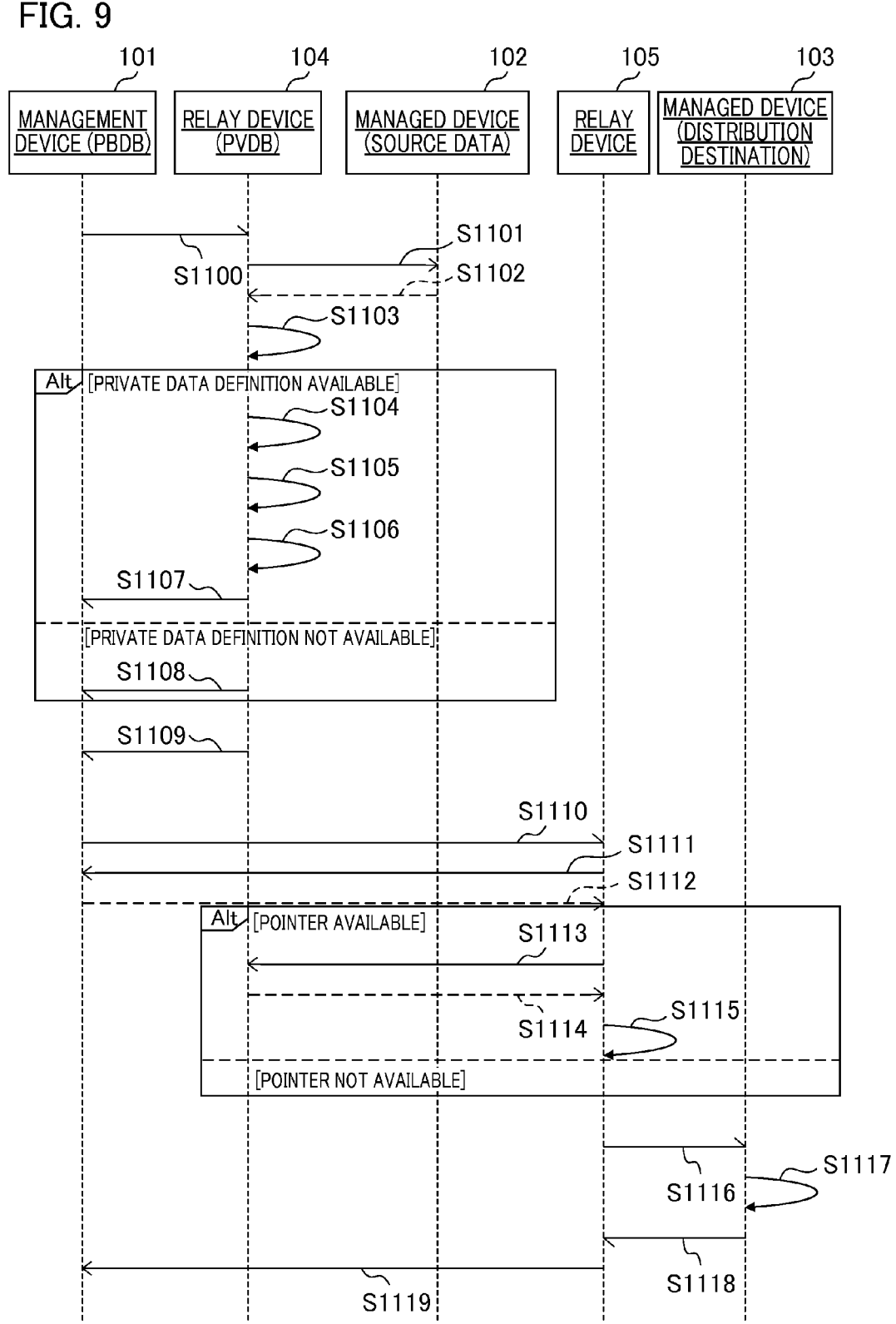
FIG. 9 is a sequence diagram describing an example of an operational process of the device management system.

FIG. 9 is a sequence diagram describing an example of an operational process of the device management system according to the second embodiment. In FIG. 9, the description will use an example of processing for copying of setting information of the managed device 102 onto the managed device 103 through the relay devices 104 and 105. The management device 101 includes the function of a DB (PBDB) configured to store public data. Furthermore, the relay device 104 includes a DB (PVDB) configured to store private data. The PVDB may be connected from the managed devices 102 and 103 and the relay devices 104 and 105 by the network, and is not limited to the relay device 104.

Firstly, relative to the relay device 104, the management device 101 acquires setting information for the source data from the managed device 102, and requests upload to the PBDB or the PVDB (step S1100). The request (data upload request) is prepared based on the data of the input screen in the management device 101 illustrated in FIG. 6 and is sent to the relay device 104 by use of a communication protocol such as SOAP or the like.

The setting management module 302 of the relay device 104 that receives the data upload request acquires setting information from the managed device 102 (step S1101). More specifically, the setting management module 501 of the managed device 102 collates its own setting information from the HD 416 and sends the information to the relay device 104 (step S1102).

Next, when the relay device 104 receives the setting information from the managed device 102, the policy management module 304 of the relay device 104 reads the policy illustrated in FIG. 4 from the database 303 or the HD 205. Then the policy management module 304 determines whether or not a definition for the private data is available (step S1103). When it is determined that a definition for the private data is available, the processing proceeds to step S1104. When it is determined that a definition for the private data is not available, the processing proceeds to step S1108.

Next, the setting management module 302 of the relay device 104 divides the setting information into public data and private data according to the determination result in step S1103 (step S1104). That is to say, the setting management module 302 and the policy management module 304 have the function of an identification unit configured to identify first information that is managed in the local system and second information that is managed outside of the local system. Next, the setting management module 302 of the relay device 104 add a pointer in relation to the storage location of private data to the private data divided in the step S1104 (step S1105).

The setting management module 302 of the relay device 104 stores the divided private data in the database 303 or the HD 205 of the relay device 104 (step S1106). The private data is stored in the PVDB by the processing in S1106. Furthermore, the setting management module 302 of the relay device 104 uploads the public data including the added pointer to the management device 101 (step S1107). That is to say, the setting management module 302 of the relay device 104 functions as a transmitting unit configured to transmit identified second information and management information (pointer) that links the first information managed in the local system with the second information. Furthermore, the setting management module 302 of the management device 101 functions as a management unit that receives and manages public data and the pointer from the relay device 104.

Next, when it is determined in the determination performed in step S1103 that a definition of the private data is not available in the policy, the setting management module 302 of the relay device 104 determines that all data is public data, and the setting management module 302 uploads data (setting information) to the PBDB (management device 101) (step S1108).

Step S1109 to S1112 is the same as step S708 to S711 in FIG. 5. The setting management module 302 of the relay device 104 acquires public data by request to the management device 101 (step S1111). When the pointer is added to this public data, the setting management module 302 of the management device 101 has the function of a distribution unit that distributes the pointer and the public data to the relay device 105 in response to the request from the relay device 105 (S1111).

When the pointer to the private data is included in the public data acquired in the step S1112, the processing proceeds to step S1116, and the setting management module 302 of the relay device 105 distributes the public data to the managed device 103. That is to say, the setting management module 302 has the function of an application unit for acquiring the second information from the management device (step S1112), and applying the information to the image forming apparatus in the local system.

When the pointer to the private data is included in the public data acquired in the step S1112, the setting management module 302 of the relay device 105 acquires the private data from the PVDB (relay device 104) (step S1113 and S1114).

Next, the setting management module 302 of the relay device 105 combines the private data acquired in the step S1114 with the public data acquired in the step S1112 (step S1115). That is to say, when the setting management module 302 provided with the relay device 105 has acquired the private data with reference to the pointer, the setting management module 302 combines the private data with the public data acquired from the management device. The setting management module 302 of the relay device 105 distributes the data combined in the step S1115 to the managed device 105 (step S1116). That is to say, when the pointer is present in the public data, that is to say, when the public data is applied together with the private data to the managed device 103, the setting management module 302 performs the following processing. The setting management module 302 acquires the private data with reference to the pointer, and distributes the acquired public data together with the private data to the managed device 103.

In step S1117, the setting management module 501 of the managed device 103 reflects the various types of acquired data in the managed device 103 itself. When the above processing is completed, the setting management module 501 of the managed device 103 notifies the relay device 105 of completion of data processing through the network module 500 (step S1118). The relay device 105 that receives the data processing completion notification notifies the management device 101 of the completion of distribution (step S1119).

Although FIG. 9 illustrates storage of PV data after completion of pointer addition processing in step S1105, step S1105 may be performed after processing in step S1106. Furthermore, although FIG. 9 illustrates that acquisition processing for PB data is continued (step S1111) relative to a data upload request (S1100), the sending of public data may be performed together with the request. Furthermore, in FIG. 9, although the data acquired in step S1112 and S1114 is combined in step S1115, the data may be distributed separately without such combination.

In the device processing system according to the second embodiment, the relay device that is disposed on the intranet relays the data upload instruction from the management device to the managed device (S1100, S1101). Furthermore, the relay device causes the managed device to acquire data in response to a data acquisition request received from the management device 101 (S1110) (S111 to S1116). Therefore, even when the number of managed devices is large, there is no requirement for the management device to output instructions for upload/download with respect to each individual managed device, and therefore the load on the management device can be reduced.

Third Embodiment

In the second embodiment, the distribution of setting information to the managed device or instructions for upload of setting information for the distribution source to the managed device was performed by the management device through the relay device. Then, the relay device acquires the private data from another relay device (PVDB). However, when the relay device acquires the private data, there is the case where the network device cannot be logically connected between the relay device performing acquisition and the PVDB that records the private data.

For example, there is the case where the PVDB that records the private data and the relay device that performs acquisition are separated by a VLAN (virtual LAN), or the case where filtering is applied to the packets on the router. In this manner, when the devices cannot be logically connected, private data acquisition by the relay device is not possible and processing fails. In this context, in the third embodiment, data acquisition by the managed device is enabled by logically moving the managed device to an environment that enables acquisition of private data.

Since the hardware configuration and the software configuration of the management device 101, the managed devices 102 and 103 and the relay devices 104 and 105 are the same as the first and second embodiments, that description will not be repeated. Furthermore, since the policy in the third embodiment and the structure of the public data and the setting UI are the same as the first and second embodiments, that description will not be repeated.

FIG. 10 is a sequence diagram describing an example of an operational process of the device management system according to the third embodiment. The processing in steps S1201 to S1208 in FIG. 10 is the same as the processing in steps S1101 to S1108 in FIG. 9 and therefore such description will not be repeated. Furthermore, since the processing in steps S1217 to S1219, and S1221 to S1225 in FIG. 10 is the same as the processing in steps S1110 to S1112 and S1115 to S1119 in FIG. 9, such description will not be repeated.

In step S1200, the management device 101 makes a request to the relay device 104 to acquire setting information as the source data from the managed device 102, and to upload the data to the PBDB or the PVDB. Although the main processing is the same as S1100 in FIG. 9, the information for the relay device (relay device 105 in FIG. 10) that manages the managed device 103 of the distribution destination is added to the sent information at the time of request.

In step S1209, the relay device 104 acquires information for the relay device, that manages the managed device 103 who is the distribution destination, from the sent information for the request received in the step S1200, and performs a communication confirmation to the relay device 105 that is indicated by this information. This processing enables confirmation of whether or not the logical network is connected.

In step S1210, the relay device 105 responds to the communication confirmation, and when communication is enabled, the answer indicates the response from the relay device 105, and when communication is not enabled, it indicates a time out. In step S1211, the relay device 104 notifies the management device 101 of a notification that includes the result of the communication confirmation in step S1209 and S1210, and reports completion of upload of respective data (completion notification).

The management device 101 receives the completion notification, and selects the processing in response to the result of the communication confirmation. When communication between the relay devices is enabled, for normal processing, that is to say, the processing described with reference to FIG. 9 is performed, the processing proceeds to step S1215.

When communication between the relay devices is not enabled, the relay device 105 cannot acquire private data from the relay device 104. Therefore, the processing proceeds to step S1212. In step S1212, the setting management module 302 of the management device 101 requests the relay device 105 to change the network settings of the managed device that is the distribution object (network settings change request). The network settings change request is a request to change the network settings to enable communication from the relay device 104 to the managed device 103. The network settings change request for example includes network settings such as the IP address or the like that enables communication by the managed device 103 from the relay device 104.

That is to say, when the relay device 104 stores private data in the predetermined storage destination, if the relay device 105 cannot directly acquire the private data from the storage destination, the setting management module 302 of the management device 101 functions as a request unit to execute the following processing. The setting management module 302 performs a change request to the relay device 105 that instructs a change to the network settings of the image forming apparatus (managed device 103) that is the application destination of the private data.

The setting management module 302 of the relay device 105 changes the network settings of the managed device 103 that is distribution object in accordance with the network setting change request (step S1213). That is to say, the setting management module 302 functions as a first setting change unit that changes the network settings of the image forming apparatus that is the application destination for private data in response to the change request received from the management device 101.

When the network settings change is completed, the managed device 103 outputs a setting change completion notification to the relay device 105 (step S1214), and then the relay device 105 notifies the management device 101 that the setting change is completed (step S1215). The management device 101 updates the association between the managed devices 102 and 103 and the relay devices 104 and 105 retained by the management device 101 itself upon receipt of the setting completion notification from relay device 105 (step S1216).

The processing in step S1216 will be described. It is assumed that the relay device ID of the relay device 104 is "1059320", the relay device ID of the relay device 105 is "1064831", and the model name of the managed device is "Device 481".

FIG. 8B illustrates an example of relay device related information after the processing in step S1216 in FIG. 10. In the relay device related information in FIG. 8, the IP address of "Device 481" in the relay device related information illustrated in FIG. 8A is changed to an IP address that enables management by the relay device 104. Furthermore, the frame for management is changed from "1064831" (relay device 105) to "1059320" (relay device 104).

In step S1220, the setting management module 302 provided with the relay device 104 acquires the private data with reference to the pointer included in the private data. Then the setting management module 302 combines the public data acquired from the management device and the acquired private data (step S1221). The setting management module 302 provided with the relay device 104 distributes the combined data to the managed device 103 (step S1222). That is to say, the relay device 104 distributes the public data acquired from the predetermined storage destination based on the pointer together with the private data to the managed device 103.

When the management device 101 in step S1225 receives notification of completion of distribution from the relay device 104, the management device 101 checks whether or not the network settings of the distribution object have been changed. When the network settings of the distribution object have been changed, the processing proceeds to step S1226. When the network settings of the distribution object have not been changed, the processing is terminated.

The steps S1226 to S1230 indicate processing to return the network settings changed in step S1212 to S1216 or the relation between the managed device 103 and the relay devices 104 and 105 to the original settings. More specifically, the management device 101 sends the network settings change request to the relay device 104 (step S1226). The settings management module 302 of the relay device 104 relays the network settings change request to the managed device 103 (step S1227). In this manner, network settings of the managed device 103 are returned to the original settings. That is to say, the settings management module 302 functions as a second settings change unit configured to return the network settings of the image forming apparatus to the original settings after distributing the private data together with the public data to the image forming apparatus (managed device 103). The managed device 103 changes the network settings in response to the network settings change request, and sends the settings change completion notification to the relay device 104 (step S1228). The relay device 104 sends the settings change completion notification to the management device 101 (step S1229). Then the settings management module 302 that is provided in the management device 101 returns the relay device related information to the original settings. For example, the relay device related information in FIG. 8B is returned to the relay device related information in FIG. 8A.

According to the device management system in the third embodiment, even when communication is not possible between relay devices, data can be acquired in relation to the managed device that is the distribution object.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-020933 filed Feb. 2, 2012, which is hereby incorporated by reference herein in its entirety.

What is claimed is:

1. A relay device in a local system that performs communication from the local system comprising an image forming apparatus through a network to a remotely provided management device, the relay device comprising:
    a memory; and
    a processor in communication with the memory, the processor configured to control:
        an acquisition unit configured to acquire information from the image forming apparatus;
        a division unit configured to divide the acquired information into first information to be managed in the local system and second information to be managed outside of the local system;
        a storing unit configured to store the first information in a database of the local system;
        an adding unit configured to add, after storing the first information in the database of the local system, management information corresponding to a storage location of the stored first information to the second information;
        a transmitting unit configured to transmit to the management device the second information to which the management information is added without transmitting the first information;
        a request unit configured to perform a request for the second information to the management device; and
        an application unit configured to apply, to the image forming apparatus in the local system, the second information acquired from the management device according to the request,
    wherein the application unit is configured to, when the management information has been added to the second information acquired from the management device according to the request, apply the stored first information corresponding to the management information together with the second information, and
    wherein the first information is private information in accordance with a policy operated by the local system and the second information is public information.

2. An information processing system comprising:
    a management device provided remotely through a network from a local system comprising an image forming apparatus; and a relay device in the local system that performs communication with the management device, wherein the relay device comprises:
a memory; and
a processor in communication with the memory,
wherein the processor is configured to control:
an acquisition unit configured to acquire information from the image forming apparatus;
a division unit configured to divide the acquired information into first information to be managed in the local system and second information to be managed outside of the local system;
a storing unit configured to store the first information in a database of the local system;
an adding unit configured to add, after storing the first information in the database of the local system, management information corresponding to a storage location of the stored first information to the second information;
a transmitting unit configured to transmit to the management device the second information to which the management information is added without transmitting the first information; and
an application unit configured to apply, to the image forming apparatus in the local system, the second information acquired from the management device according to a request,
wherein the application unit is configured to, when the management information has been added to the second information acquired from the management device according to the request, apply the stored first information corresponding to the management information together with the second information
wherein the management device comprises:
a management unit configured to receive and manage the second information and the management information from the relay device; and
a distribution unit configured to distribute the second information and the management information to the relay device in response to the request from the relay device, and
wherein the first information is private information in accordance with a policy operated by the local system and the second information is public information.

3. The information processing system according to claim 2,
wherein the local system includes a plurality of relay devices,
wherein the management device further comprises:
a request unit configured to perform a change request to a second relay device to instruct a change to network settings of the image forming apparatus that is an application destination of the first information in a case that the second relay device included in the local system cannot directly acquire the first information from the database in which a first relay device included in the local system has stored the first information, and
wherein the second relay device further comprises:
a first settings change unit configured to change the network settings of the image forming apparatus that is the application destination for the first information in response to the change request received from the management device, and
wherein the application unit of the first relay device distributes the first information, acquired from the database based on the management information, together with the second information to the image forming apparatus that is an application object.

4. The information processing system according to claim 3,
wherein the first relay device further comprises:
a second settings change unit configured to return the network settings of the image forming apparatus to original settings after the first information, acquired from the database, together with the second information, is distributed based on the management information by the application unit of the first relay device to the image forming apparatus that is the application destination.

5. A method for controlling a relay device in a local system that performs communication from the local system comprising an image forming apparatus through a network to a remotely provided management device, the method comprising:
acquiring information from the image forming apparatus;
dividing the acquired information into first information to be managed in the local system and second information to be managed outside of the local system;
storing the first information in a database of the local system;
adding, after storing the first information in the database of the local system, management information corresponding to a storage location of the stored first information to the second information;
transmitting to the management device the second information to which the management information is added without transmitting the first information;
performing a request for second information to the management device; and
applying, to the image forming apparatus in the local system, the second information acquired from the management device according to the request,
wherein, upon application of the second information, when the management information has been added to the second information acquired from the management device according to the request, the stored first information corresponding to the management information is applied together with the second information, and
wherein the first information is private information in accordance with a policy operated by the local system and the second information is public information.

6. A method for managing an image forming apparatus in an information processing system comprising a management device through a network remotely provided from a local system that comprises the image forming apparatus, and a relay device in the local system that communicate with the management device, the method comprising:
acquiring by the relay device information from the image forming apparatus;
dividing by the relay device the acquired information into first information to be managed in the local system and second information to be managed outside of the local system;
storing by the relay device the first information in a database of the local system;
adding by the relay device, after storing the first information in the database of the local system, management information corresponding to a storage location of the stored first information to the second information;
transmitting by the relay device to the management device the second information to which the management information is added without transmitting the first information;

receiving and managing by the management device the management information and the second information from the relay device;

performing by the relay device a request for the second information to the management device;

distributing by the management device the second information and the management information to the relay device in response to the request from the relay device; and applying by the relay device the second information acquired from the management device to the image forming apparatus in the local system according to the request, wherein upon application of the second information, when the management information has been added to the second information acquired from the management device according to the request, the stored first information corresponding to the management information is applied together with the second information, and wherein the first information is private information in accordance with a policy operated by the local system and the second information is public information.

7. A non-transitory storage medium on which is stored a computer program for making a computer execute a method for controlling a relay device in a local system that performs communication from the local system comprising an image forming apparatus through a network to a remotely provided management device, the method comprising:

acquiring information from the image forming apparatus;

dividing the acquired information into first information to be managed in the local system and second information to be managed outside of the local system;

storing the first information in a database of the local system;

adding, after storing the first information in the database of the local system, management information corresponding to a storage location of the stored first information to the second information;

transmitting to the management device the second information to which the management information is added without transmitting the first information;

performing a request for the second information to the management device; and applying, to the image forming apparatus in the local system, the second information acquired from the management device according to the request, wherein, upon application of the second information, when the management information has been added to the second information acquired from the management device according to the request, the stored first information corresponding to the management information is applied together with the second information, and wherein the first information is private information in accordance with a policy operated by the local system and the second information is public information.

8. The relay device according to claim 1, wherein the relay device and the image forming apparatus are built independently of each other in the local system.

* * * * *